(12) United States Patent
Gukal

(10) Patent No.: US 9,892,166 B2
(45) Date of Patent: Feb. 13, 2018

(54) PARTITIONING LOG RECORDS BASED ON TERM FREQUENCY AND TYPE FOR SELECTIVE SKIPPING DURING FULL-TEXT SEARCHING

(71) Applicant: CA, INC., New York, NY (US)

(72) Inventor: Sreenivas Gukal, Santa Clara, CA (US)

(73) Assignee: CA, INC., New York, NY (US)

( * ) Notice: Subject to any disclaimer, the term of this patent is extended or adjusted under 35 U.S.C. 154(b) by 582 days.

(21) Appl. No.: 14/510,401

(22) Filed: Oct. 9, 2014

(65) Prior Publication Data

US 2016/0103881 A1 Apr. 14, 2016

(51) Int. Cl.
*G06F 17/30* (2006.01)

(52) U.S. Cl.
CPC .. *G06F 17/30516* (2013.01); *G06F 17/30554* (2013.01)

(58) Field of Classification Search
CPC ........... G06F 17/30516; G06F 17/3086; G06F 17/30554; G06F 17/30867
See application file for complete search history.

(56) References Cited

U.S. PATENT DOCUMENTS

| | | | | |
|---|---|---|---|---|
| 8,112,425 | B2* | 2/2012 | Baum | G06F 17/30551 |
| | | | | 707/746 |
| 8,533,193 | B2* | 9/2013 | Hubbard | G06F 17/30637 |
| | | | | 707/737 |
| 2011/0010362 | A1* | 1/2011 | Kim | G06F 17/30864 |
| | | | | 707/722 |
| 2013/0226959 | A1* | 8/2013 | Dittrich | G06F 17/30442 |
| | | | | 707/769 |
| 2015/0213631 | A1* | 7/2015 | Vander Broek | G06T 11/206 |
| | | | | 345/589 |

* cited by examiner

*Primary Examiner* — Robert Beausoliel, Jr.
*Assistant Examiner* — Susan F Rayyan
(74) *Attorney, Agent, or Firm* — Sage Patent Group

(57) ABSTRACT

A log record from a host machine node includes terms. Frequency of occurrence of the terms across a stream of log records is determined. Based on the frequency satisfying a threshold, a Bloom filter vector is selected from among a plurality of Bloom filter vectors based on the frequency, the Bloom filter vector is updated based on the terms, and an identifier for the log record is stored with an association to the Bloom filter vector. In contrast, based on the frequency of occurrence not satisfying the defined frequency range, a type identifier is identified based on the terms, a Bloom filter vector is selected from among the plurality of Bloom filter vectors based on the type identifier, the Bloom filter vector is updated based on the terms, and an identifier for the log record is stored with an association to the Bloom filter vector.

18 Claims, 4 Drawing Sheets

PARTITIONING LOG RECORDS BASED ON TERM FREQUENCY AND TYPE FOR SELECTIVE SKIPPING DURING FULL-TEXT SEARCHING

TECHNICAL FIELD

The present disclosure relates to computer systems and more particularly to analysis of a stream of log records from computer equipment.

BACKGROUND

Data centers can contain thousands of servers (both physical and virtual machines), with each server running one or more software applications. The servers and software applications generate streams of log records to indicate their operational states and progression. For example, software applications may output log records that sequentially list actions that have been performed and/or list application state information at various checkpoints or when triggered by defined events (e.g., faults) occurrence, etc.

These log records are stored and searched by systems operators for various purposes—e.g., to detect anomalies, troubleshoot problems, mine information, check the health of the servers, etc.

In existing systems, the log records are stored in a log record repository, which may be a full-text index (FTI). An FTI allows complex text queries to be performed on the log records. The storage requirements of an FTI are proportional to the amount of content in each of the log records. The log records can be generated on the order of millions per second for large data centers. At these rates, storing the log records efficiently (both in terms of space and time), while also allowing for efficient searches, can be a significant challenge.

SUMMARY

Some embodiments disclosed herein are directed to a method by a log record processing computer. The method includes receiving a log record as part of a stream of log records from a host machine node. The log record includes terms. The method further includes determining frequency of occurrence of the terms across the log records of the stream. Based on the frequency of occurrence satisfying a defined frequency threshold, a frequency partitioned Bloom filter vector is selected from among a plurality of Bloom filter vectors in a repository based on the frequency, the frequency partitioned Bloom filter vector in the repository is updated based on the terms, and an identifier for the log record is stored with an association to the frequency partitioned Bloom filter vector. In contrast, based on the frequency of occurrence not satisfying the defined frequency range, a type identifier is identified based on the terms, a type identifier partitioned Bloom filter vector is selected from among the plurality of Bloom filter vectors in the repository based on the type identifier, the type identifier partitioned Bloom filter vector is updated in the repository based on the terms, and an identifier for the log record is stored with an association to the type identifier partitioned Bloom filter vector.

Some other embodiments disclosed herein are directed to a computer program product that includes a computer readable storage medium having computer readable program code embodied therewith. The computer readable program code includes computer readable program code to receive a log record as part of a stream of log records from a host machine node. The log record includes terms. Computer readable program code determines frequency of occurrence of the terms across the log records of the stream. Based on the frequency of occurrence satisfying a defined frequency threshold, computer readable program code selects a frequency partitioned Bloom filter vector from among a plurality of Bloom filter vectors in a repository based on the frequency, updates the frequency partitioned Bloom filter vector in the repository based on the terms and associating, and stores an identifier for the log record associated with the frequency partitioned Bloom filter vector. Based on the frequency of occurrence not satisfying the defined frequency range, computer readable program code identifies a type identifier based on the terms, selects a type identifier partitioned Bloom filter vector from among the plurality of Bloom filter vectors in the repository based on the type identifier, updates the type identifier partitioned Bloom filter vector in the repository based on the terms, and stores an identifier for the log record associated with the type identifier partitioned Bloom filter vector.

BRIEF DESCRIPTION OF THE DRAWINGS

Aspects of the present disclosure are illustrated by way of example and are not limited by the accompanying drawings. In the drawings.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Figure 1:
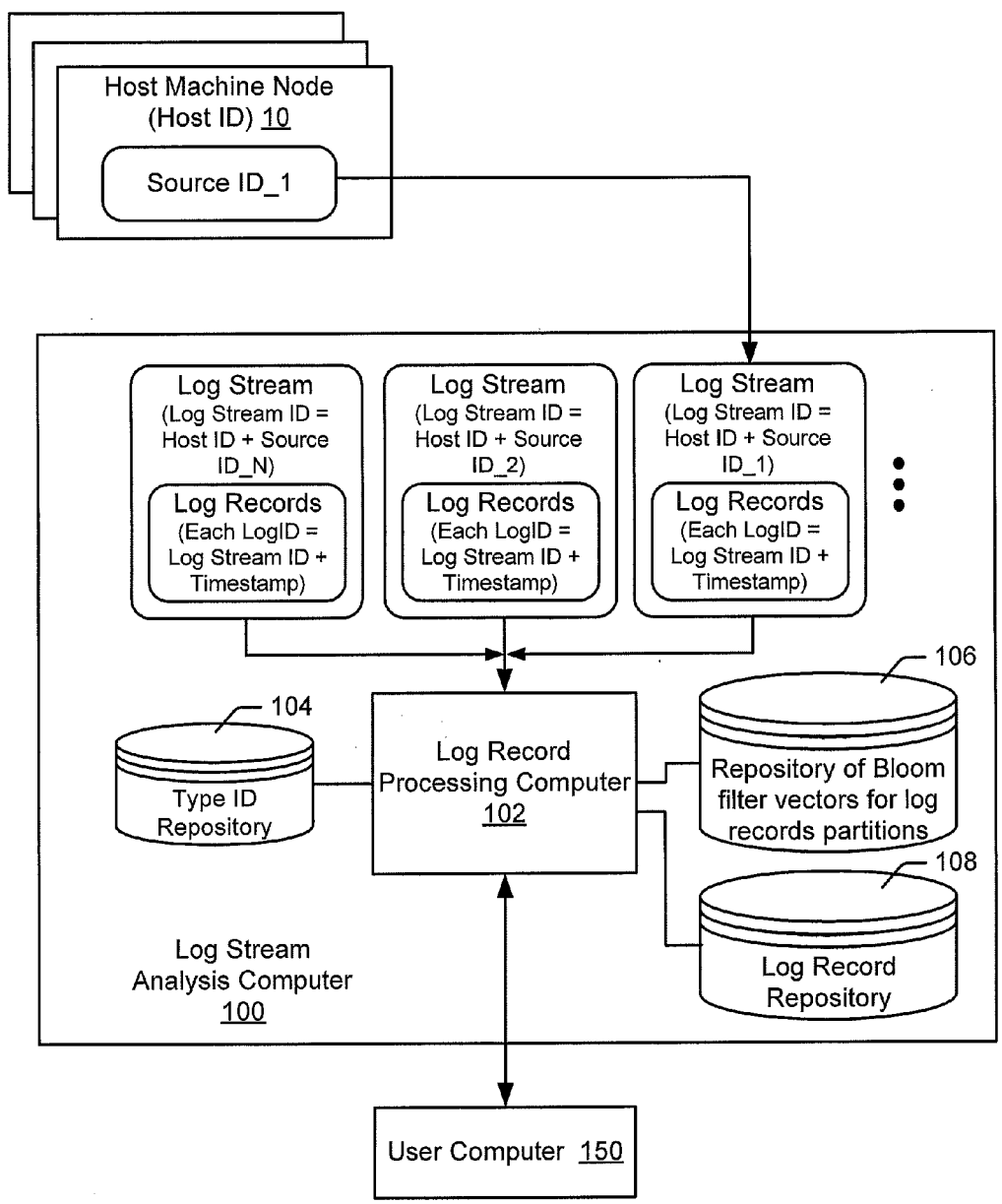
FIG. 1 is a block diagram of a system containing a log stream analysis computer which includes a log record processing computer that partitions log records based on frequency of occurrence of terms in log records and based on log record types, in accordance with some embodiments.

Some embodiments are disclosed herein in the context of the nonlimiting example block diagram of FIG. 1. A log stream analysis computer 100 receives log streams from one or more software sources executed by each of one or more host machine nodes 10. In the embodiment of FIG. 1, the log stream analysis computer 100 receives a log stream from Source ID_1 executed by the host machine node 10 identified by a Host ID, and can further receive log streams from other software sources executed by the same or other host machine nodes. A host machine node is also referred to as a "host node" and "host" for brevity.

A host machine node can include a physical host machine and/or a virtual machine (VM). The physical host machine includes circuitry that performs computer operations to execute one or more software sources. The physical host machine may include, without limitation, network content servers (e.g., Internet website servers, movie/television programming streaming servers, application program servers), network storage devices (e.g., cloud data storage servers), network data routers, network gateways, communication interfaces, program code processors, data memories, display devices, and/or peripheral devices. The physical host machine may include computer resources such as: processor(s), such as a central processing unit (CPU); network interface(s); memory device(s); mass data storage device(s), such as disk drives, solid state nonvolatile memory, etc.; etc.

A physical host machine can provide one or more VMs that execute one or more software sources. A virtual hypervisor can provide an interface between the VMs and a host operating system that allows multiple guest operating systems and associated software sources to run concurrently on a physical host machine. The host operating system is responsible for the management and coordination of activities and the sharing of the computer resources of the physical host machine.

Each software source belongs to a source type. For example, a "SQL Server" may be a source type and each installation of SQL Server is a software source belonging to the source type. Multiple sources of the same or different source types may be on the same host, and a software source may migrate between hosts. Each host and software source is identified by a unique identifier, Host ID and Source ID respectively. A log stream (generated by a software source of a particular host) can be uniquely identified by a compound identifier generated from combination of the Host ID and Source ID, or in some embodiments may be uniquely identified by an identifier generated from the Source ID. As will be explained below, the Host ID and/or the Source ID may be used to identify a type of log record that is received in a stream from the host machine node 10.

The log stream analysis computer 100 includes a log record processing computer 102 that partitions the received log stream into a sequence of log records according to a defined time interval (e.g., a defined number of seconds, minutes, or hours) or other defined event or rule. Each log record may be uniquely identified by an identifier (LogID) that is formed from a combination (e.g., concatenation) of the corresponding (Log Stream ID) from which the record was partitioned and a timestamp associated with the defined time interval or other defined event or rule. When a single log stream is received from a host machine node, the log record may be uniquely identified based on the timestamp alone. The interval size can be determined based on a trade-off analysis between storage space requirements and accuracy.

The log record processing computer 102 may store content of the log records in a log record repository 108. The log records may be indexed, such as by an inverted index, to facilitate searches among log records in the log record repository 108. As used herein, an index can provide a data structure which associates content of log records, such as strings of letters, words, and/or numbers, (referred to herein as "terms") to their locations in the log records. The index allows running full-text queries on the log records. However, the storage needed for the index is a significant fraction of the input data size. The indexing time, storage and the search time are all proportional to the number of log records. In some distributed computing systems, such as large data centers, log records are generated on the order of millions per second. It can therefore be overly time-consuming and/or require excessive processing resources to conduct searches in the log record repository 108.

In accordance with some embodiments, the log record processing computer 102 uses data-skipping to skip partitions of log records in the log record repository 108 while running a search query. The log records are partitioned based on how often the terms they contain occur within a log string that is presently being received from the host machine node 10 and/or based on an earlier defined one or more log streams. A data structure is used to capture metadata about each partition of log records. If a partition is determined (by using the metadata) not to contain any log records that satisfy a search query, that partition is skipped (not searched) for that search query. This process can prevent use of processing, networking, and storage resources of the log stream analysis computer 100 and other associated system components for searching the skipped partitions, which otherwise would result in no identified log records satisfying the search query. The resulting search query may thereby be performed faster.

In some embodiments the log record processing computer 102 is used to partition and search for full-text documents (records with no structure). Metadata for each partition of unstructured log record data is stored, and used to identify partitions of log records that are to be skipped while performing a search query. Some embodiments are directed to processing log traces. Some embodiments partition log records based on knowledge of the types of search queries that are known to be performed on the log records, which may be used to maximize the amount of log records that can be skipped while performing a search query.

The log record processing computer 102 can partition log records based on one or more defined partitioning rules. For example, log records that contain terms which occur very infrequently can be grouped into one partition. The very infrequently occurring terms can be associated with warnings, errors or other anomalies that are important for a system operator to be able to perform efficient search queries to identify. Log records can be partitioned into different partitions associated with different frequency ranges for occurrence of terms and the log records. Other log records which are determined to be a defined log record type can be grouped into another partition. A plurality of different defined log record types may exist, and log records associated with different ones of the defined work log record types can be grouped into different partitions. The type of each log record may be determined using information contained in a type identifier repository 104, as explained in further detail below. Still other partitions of log records can be formed for log records containing one or more defined terms defined by a partitioning rule. Another partition of log records may be formed for log records containing terms that do not satisfy one or more of the other partition rules. Accordingly, the partitioning rules may be generated based on knowledge of the types of full-text searches that will be run on log records in the log record repository 108.

The terms in a log stream that occur infrequently can be identified. The infrequent terms can be defined by a user, predetermined from log records received in the same log stream or one or more other defined log streams, and/or dynamically identified based on content of log records being received in the log stream. The infrequent terms may be identified by counting the number of occurrences of each term in the log stream. The counters can be implemented using a deterministic data structure, such as a binary tree (B-Tree) or hash (based on the <record type, term>) index, and/or a probabilistic data structure such as Count-Min Sketch. The user can define a frequency limit for infrequent terms. As an example, with the frequency limit set at 0.001%, and a training set of 1 million records, a data structure with 4 bits for each counter can be used. Here, all the <record type, term> combinations for which the frequency is less than 10 are infrequent terms.

Log records in a log stream that contain one or more infrequent terms can be partitioned into a same partition. This partition may contain log records belonging to several different log record types, but all log records in this petition contain the one or more infrequent terms.

Other log records that are not within the infrequent term partition, can be partitioned based on their types. Different types of log records can be partitioned into different partitions. For example, when a log stream has N types of log records. Some of these record types may occur frequently, while other types may have only a few records. The user specifies the number of partitions, assume M, into which the log records have to be divided. A partitioning rule may operate to divide the log records as evenly as possible across the M partitions.

Using learning sets (e.g., analyzing log records that were earlier received in the same log stream or one or more other bloodstreams) the log record processing computer 102 can predetermine the percentage of log records belonging to each record type in the log stream. A bin-packing algorithm can be used to determine how to distribute the N record types among the M partitions. Hence, a partition may have more than 1 record type, but records of a particular type are always in the same partition.

The log records in each of these partitions may also be further partitioned based on insertion order or timestamps (if specified by the user). A Bloom filter vector is generated for log records within a defined one of the partitions. Accordingly, M different Bloom filter vectors can be generated based on the log records within different ones of the M different partitions. Using timestamps to further sub-partition log records within a partition can serve to reduce the memory space that is used to store the Bloom filter vectors.

An index of terms for each partition of log records is generated. A deterministic data structure to keep all the terms may be used, but would occupy the relatively large memory space and use a significant amounts of processing determine identify whether terms are present within a partition. In accordance with some embodiments, the log record processing computer 102 generates Bloom filter vectors each one of which identifies terms contained in log records within a different one of the partitions. The Bloom filter vectors can be stored in a repository 106. A Bloom filter vector can be generated based on the terms in all log records within a partition, and each partition can be associated with a different Bloom filter vector. A Bloom filter is a probabilistic data structure that needs a minimum of space and never provides false negatives as to what terms are contained within log records of a partition.

The log record computer 102 can perform a search to identify log records that contain terms which satisfy a search query received from a user computer 150 (e.g., desktop computer, laptop computer, tablet computer, smart phone, etc.). In accordance with some embodiments, the log record computer 102 received a search query defining search terms. The log record computer 102 searches using the repository 106 of Bloom filter vectors to identify a subset of the Bloom filter vectors that contain all of the search terms, and then identifies partitions of log records associated with the subset of the Bloom filter vectors. The log record processing computer 102 then performs a full-text search for the search terms defined by the search query among the log records in each of those identified partitions of log records. Importantly, partitions of log records associated with any of the Bloom filter vectors that did not contain all of the search terms, are not searched (i.e., skipped).

Further to the example scenario above, if the search query contains infrequent terms and/or a defined type of log records, then fewer partitions of log records are searched while possibly most other partitions are skipped from searching.

Figure 2:
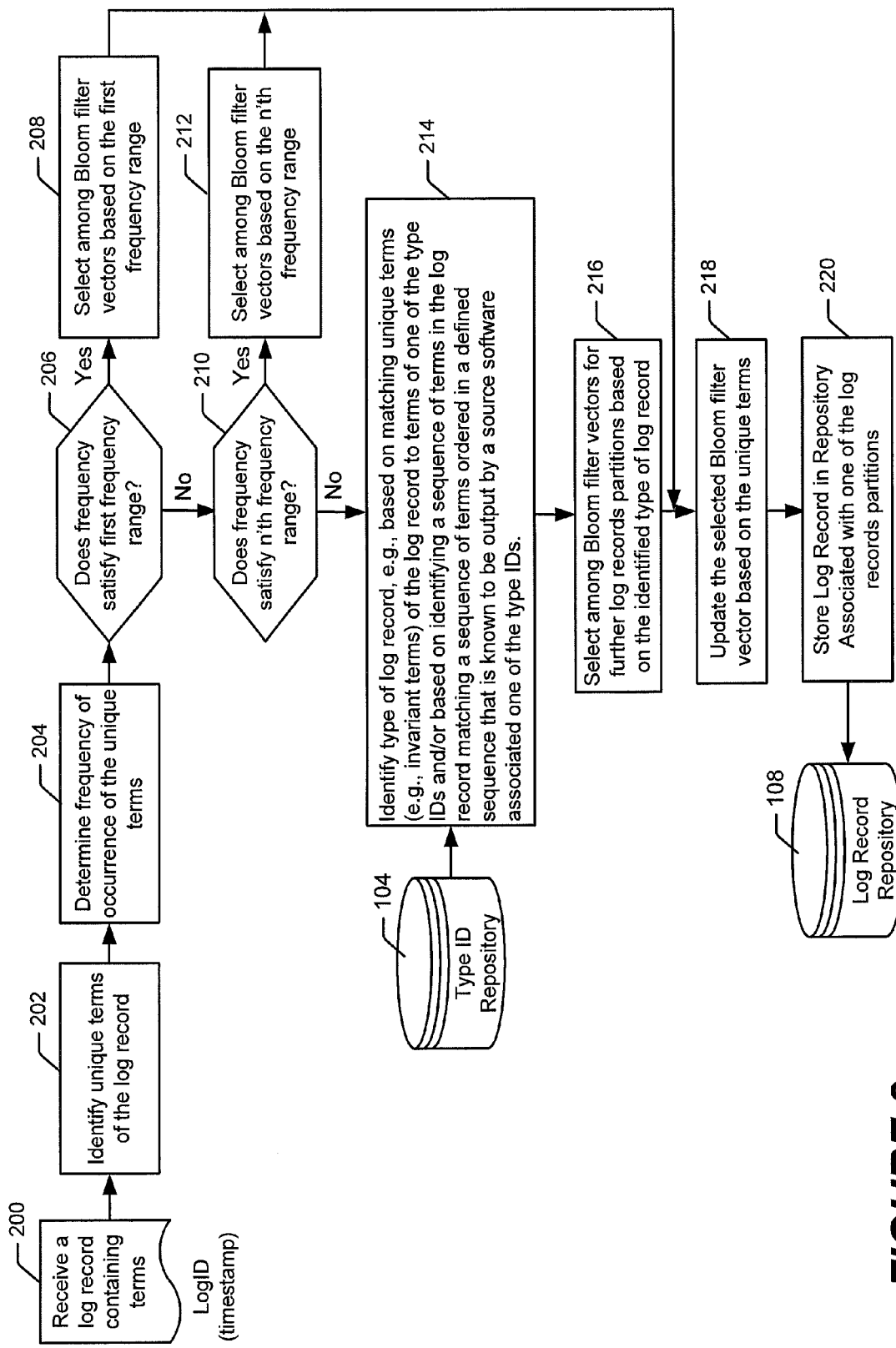
FIG. 2 is a flowchart of operations by the log stream analysis computer for updating Bloom filter vectors selected based on frequency of occurrence of terms in log records and based on log record types, in accordance with some embodiments.

FIG. 2 is a flowchart of operations by the log stream analysis computer 102 for updating Bloom filter vectors in the repository 106 selected based on frequency of occurrence of terms in log records and based on log record types, in accordance with some embodiments.

Referring to FIG. 2, the log stream analysis computer 102 receives (block 200) a log record containing terms. The log record may be identified by a log ID which is unique across all of the log records. The log ID can be generated based on a timestamp for when the log record was generated. The timestamp is translated into some time unit (based on the log record generation rate) since a fixed point in time (called epoch). For example, suppose the time unit is seconds, the epoch is (Jan 1, 2001 00:00:00 AM) and the log record was generated on Jun 1, 2015 at 10:45:15 AM. The logID will be the difference between the timestamp and the epoch, converted into seconds.

Unique terms contained in the log record are identified (block 202). The frequency of occurrence of the unique terms is determined (block 204) across the log records of the stream. Based on the frequency of occurrence satisfying a defined frequency threshold (block 206), the log stream analysis computer 102 selects (block 208) a frequency partitioned Bloom filter vector from among a plurality of Bloom filter vectors in a repository (106 in FIG. 1) based on the frequency. The selected Bloom filter vector in the repository 106 is updated (block 218) based on the terms. An identifier for the log record is stored (block 220) with an association to the frequency partitioned Bloom filter vector. The log record is stored (block 220) in the repository 108 associated with one of the log record partitions. For example, the log record may be stored with an identifier for the Bloom filter vector that was updated based on the content of the log record.

In contrast, based on the frequency of occurrence not satisfying the defined frequency range (block 206), a type identifier for the log record is identified (block 214) based on the terms contained in the log record. A type identifier partitioned Bloom filter vector is selected (block 216) from among the plurality of Bloom filter vectors in the repository (106 of FIG. 1) based on the type identifier. The type identifier partitioned Bloom filter vector in the repository 106 is updated (block 218) based on the terms. An identifier for the log record is stored (block 220) with an association to the type identifier partitioned Bloom filter vector. The log record is stored (block 220) in the repository 108 associated with one of the log record partitions. For example, the log record may be stored with an identifier for the Bloom filter vector that was updated based on the content of the log record.

Each of the Bloom filter vectors is built as a probabilistic data structure that indicates set membership of terms of the log records used to build the Bloom filter vector. The Bloom filter vector is used to determine whether one or more terms defined by a search query are present in any of the log records within the partition of log records that were used to build the Bloom filter vector. False positive matches are possible, but false negatives are not, thus a Bloom filter vector has a 100% recall rate. In other words, a query of one of the Bloom filter vectors returns an indication that a term defined by a search query is possibly in one or more of the log records or definitely not in any of the log records within the partition. The Bloom filter vector size is defined based on the number of unique terms that have been identified in the log stream. In one embodiment, the size of the Bloom filter vector, once defined, remains the same for all time intervals for that log stream.

In one embodiment, an empty Bloom filter vector is a bit array of m bits, all set to logic 0. The log record processing computer can update a selected Bloom filter vector using k different hash functions, each of which maps or hashes terms of the log record to one of the m array positions with a uniform random distribution. To update the log record, terms of the log record are fed to each of the k hash functions to get k array positions within the vector. The bits at all of these positions may, for example, be set to logical 1.

The partitioning of log records according to the frequency of occurrence of their terms and the various defined types of log records include further operations that are now explained with continuing reference to FIG. 2.

The log record processing computer 102 may determine (block 204) the frequency of occurrence of the unique terms and further determine whether the frequency satisfies a defined frequency range, based on a list of terms that have been defined by a user. For example, the log record processing computer 102 may retrieve a list of infrequently occurring terms, and determine (blocks 204-206) that the frequency of occurrence satisfies a defined frequency threshold based on a defined number of the terms of the received (block 200) log record matching the infrequently occurring terms in the list.

In some other embodiments, the determination of the frequency of occurrence and whether the frequency satisfies a frequency range can be dynamically adapted based on how frequently different unique terms are being observed in the received log records within the same log stream from the same software source (e.g., Source ID_1) and/or host machine node 10, and/or received within one or more different defined log streams (e.g., a set of training data containing log records).

The log record processing computer 102 may partition the log records into a plurality of different partitions which are each associated with different frequency ranges for the occurrence of terms in those log records. For example, when the frequency of occurrence of unique terms is determined (block 206) to satisfy a first frequency range, a Bloom filter vector associated with the first frequency range can be selected (block 208) from among the Bloom filter vectors. In contrast, when the frequency of occurrence of unique terms is determined (block 210) to not satisfy the first frequency range but instead satisfy an n'th frequency range, a Bloom filter vector associated with the n'th frequency range can be selected (block 208) from among the Bloom filter vectors. Accordingly, the incoming log records can be associated with (partitioned into) n different Bloom filter vectors based on unique terms contained in those log records having frequencies of occurrence that satisfy one or more of the n defined frequency ranges, where n is any positive integer.

The frequency ranges may be set by different frequency thresholds (e.g., which define an upper boundary and/or lower boundary of the range). The frequency thresholds can be defined by a user or may be determined based on frequency of occurrence of one or more defined terms and historically received log records. For example, the log record processing computer 102 may count, for each unique term contained in earlier log records that are received, a number of occurrences of the unique term to generate a historical count for the unique term. A frequency threshold can be defined based on the historical count, and the frequency threshold can be stored among a set of frequency thresholds with a logical association to the unique term. The log record processing computer 102 can select frequency thresholds from among the set of frequency thresholds based on the terms of the log record, and can determine (blocks 206 and 210) whether the frequency of occurrence satisfies the defined frequency threshold based on comparing the frequency of occurrence of the terms to the frequency thresholds selected from among the set of frequency thresholds.

To count a number of occurrences of the unique term to generate the historical count for the unique term, the log record processing computer 102 may count a number of occurrences of the unique terms contained in earlier log records received in the stream of log records from the host machine node 10.

To define a frequency threshold based on the historical count, the log record processing computer 102 may decrease values of the frequency thresholds selected from among the set of frequency thresholds based on less frequent occurrence of the terms within a defined time interval, and may increase values of the frequency thresholds selected from among the set of frequency thresholds based on more frequent occurrence of the terms within the defined time interval. Accordingly, the frequency thresholds may be dynamically adjusted to track rates of occurrence of different terms occurring in log records.

Various example approaches for determining (block 214) the type of a log record are now explained.

Each type of log record can, for example, correspond to a different "print" or other output routine in the software code of the host machine node 10. A log record which is output can contain one or more invariant terms (e.g., which does not vary between "prints" by the same print route) and one or more variant terms (e.g., which can vary between "prints" by the same print routine) that is output in a same log record by the print statement whenever the print routine is executed. The invariant term(s) may provide context for the variant term(s), such as a textual description that is intended for human understanding of the variant term(s), and which does not change between each repetition of the print routine or other output routine which generates the log record. The variant term(s) can include user names, IP addresses of the host machine nodes, event identifiers, values characterizing an application state (e.g., variable and/or register values) at an instant of time, processing error codes, etc, that can vary between each repetition of the print routine or other output routine which generates the log record.

The log record processing computer may identify (block 214) a type identifier within a type identifier repository 104 based on a predefined rule that identifies the structure of invariant terms(s) and variant term(s) that are output by print routines or other output routines of a software source which is the source of the log stream. The Host ID and Source ID, when known for a received log record, may be used to identify the type identifier. When this structure is not predefined by a rule, the template identifier can be inferred using one of the following embodiments.

In one embodiment, the log record processing computer 102 identifies a type identifier within a type identifier repository 104 by matching unique term(s) of the log record to template term(s) contained in the repository 104 which are associated with one of the type identifiers. In another embodiment, the type identifier is identified by matching a sequence of terms in the log record to a sequence of template terms ordered in a defined sequence output by a source software associated with one of the type IDs. For example, a particular source software having a defined type ID may be known to output a particular string of terms, which can be identified within a log record and thereby matched to the defined type ID.

Searching Log Records Using the Partitioned Bloom Filter Vectors

Figure 3:
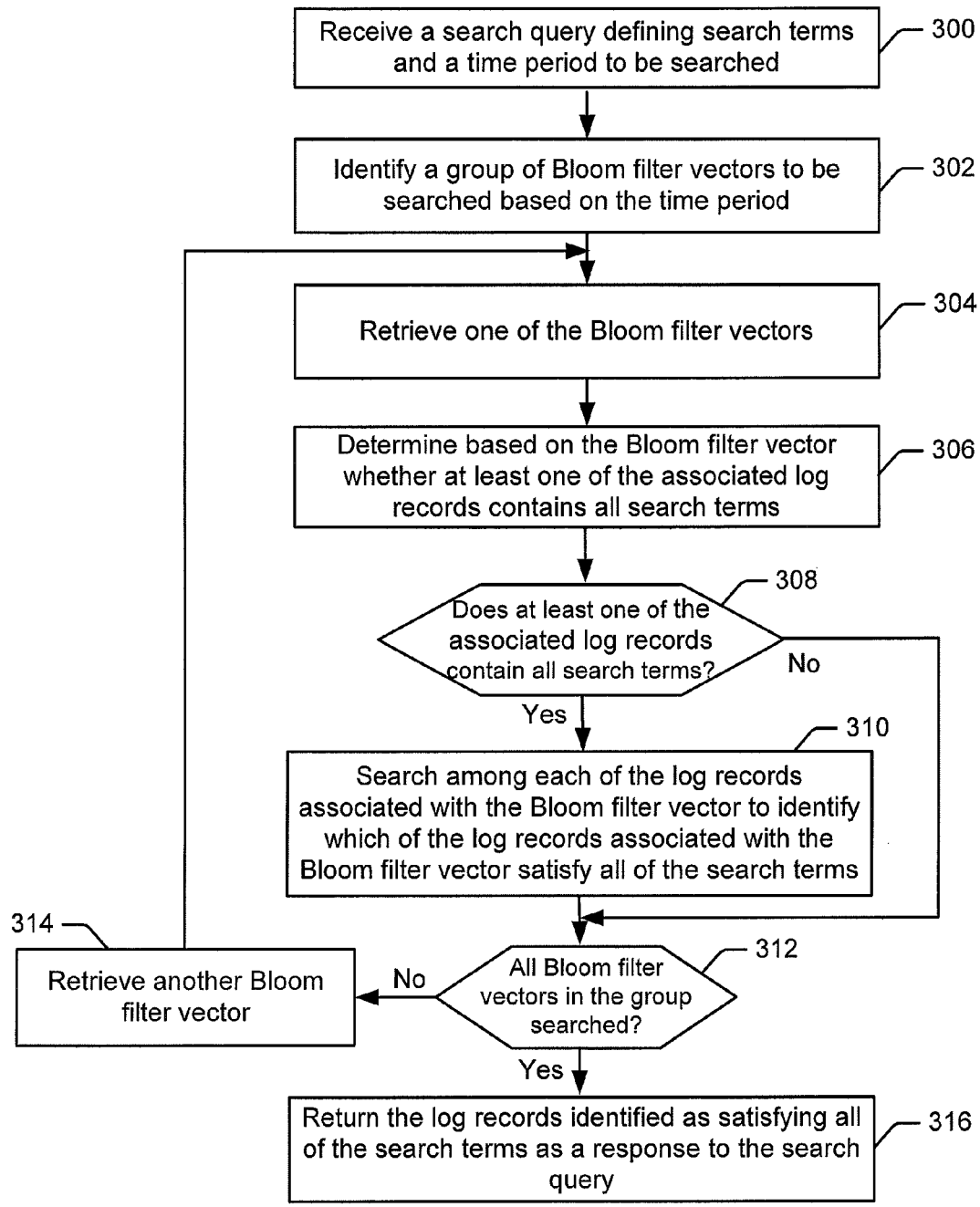
FIG. 3 is a flowchart of operations by the log record processing computer for performing search queries within a log record repository using the Bloom filter vectors, in accordance with some embodiments.

FIG. 3 is a flowchart of operations that may be performed by the log record processing computer 102 for performing search queries on the log records within the log record repository 108, but using the partitioned Bloom filter vectors to enable skipping of partitions of the log records during the searching.

Referring to FIG. 3, a search query is received (block 300) that defines search terms and may further define a time period to be searched. A group (e.g., range) of log records to be searched is identified (block 302) based on the time period. One of the Bloom filter vectors is retrieved (block 304) from the repository of Bloom filter vectors. The Bloom filter vector is used to determine (block 306) whether at least one of the associated log records (i.e., the log records used to build the Bloom filter vector) contains all of the search terms.

In one embodiment, to determine (block 306) whether any log records associated with the Bloom filter vector contain all of the search terms (test whether the search terms are within the set of terms which were used to build the Bloom filter vector), the search terms are fed to each of the k hash functions to get k array positions. If any of the bits at these positions are 0, one or more of the search terms are definitely not in the set—if it were, then all the bits would have been set to 1 when the terms were inserted. If all are 1, then either all of the search terms are within the set of terms contained in the log records used to build the Bloom filter vector, or the bits have by chance been set to 1 during the insertion of other terms, resulting in a false positive.

When at least one of the associated log records contains all of the search terms, those log records are retrieved from the log record repository 108 and a search (e.g., full-text search) is performed (block 310) through each of those log records associated with the Bloom filter vector to identify which of the log records satisfy all of the search terms. A log record may satisfy all of the search terms by containing the search terms and further satisfying any logic relationship (e.g., "and", "or", "not", etc.) that may be defined by the search query between the search terms. The identified log records can be added to a list.

A determination (block 312) is made whether all of them filter vectors in the group have been searched and, if not, another Bloom filter vector is retrieved (314) from the repository of Bloom filter vectors. Accordingly, the operations of blocks 304-314 are repeated until all Bloom filter vectors within the group have been searched (block 310).

It is noted that the log records associated with other Bloom filter vectors which were determined (block 306) to not contain at least one log record containing all of the search terms, are not searched (block 310) using a full-text search. Not searching these other log records (i.e., skipping them) may substantially reduce the processing resources, memory resources, and network resources of the log stream analysis computer 100 that are used to perform search queries on the log records in the log record repository 108.

Log records which were identified by the search (block 310) as satisfying all of the search terms are returned (block 316) as a response to the search query. When returning (block 316) the log records as a response, those log records can be retrieved from the log record repository 108 and added to a report which is communicated to to the user computer 150 from which the search query was received.

Example Log Stream Analysis Computer

Figure 4:
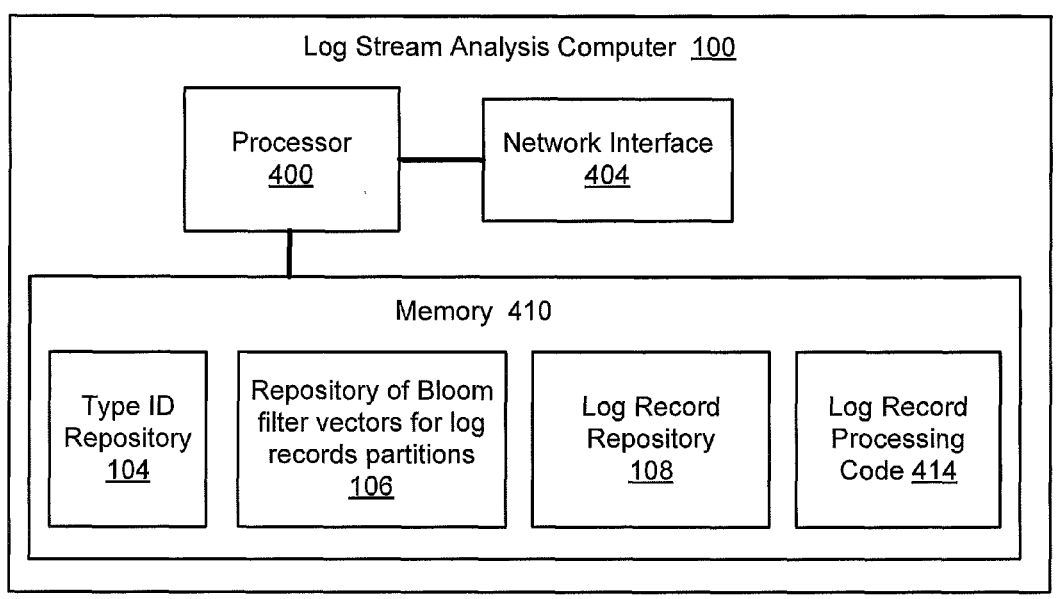
FIG. 4 is a block diagram of a log stream analysis computer configured according to some embodiments.

FIG. 4 is a block diagram of the log stream analysis computer 100 or a component thereof in FIG. 1 configured according to one embodiment. Referring to FIG. 4, a processor 400 may include one or more data processing circuits, such as a general purpose and/or special purpose processor (e.g., microprocessor and/or digital signal processor) that may be collocated or distributed across one or more networks. The processor 400 is configured to execute computer readable program code in a memory 410, described below as a computer readable medium, to perform some or all of the operations and methods disclosed herein for one or more of the embodiments. The program code can include log record processing code 414 configured to perform operations and methods of one or more of the embodiments disclosed herein for the log record processing computer 102 and other components of the log stream analysis computer 100. The memory 410 may further include the type ID repository 104, the repository of Bloom filter vectors 106, and/or the log record repository 108.

Although a single memory block 410 has been illustrated for simplicity, it is to be understood that any number, combination of types, and hierarchy of memory storage devices (e.g, solid state memory devices, local disk drives, networked disk drives, etc.) can be used. A network interface 404 can communicatively connect the processor 400 to the host machine nodes 10 and the user computer 150 shown in FIG. 1.

Further Definitions and Embodiments:

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method by a log record processing computer comprising:
   receiving a log record as part of a stream of log records from a host machine node, the log record comprising terms;
   determining frequency of occurrence of the terms across the log records of the stream;
   based on the frequency of occurrence satisfying a defined frequency threshold:
     selecting a frequency partitioned Bloom filter vector from among a plurality of Bloom filter vectors in a repository based on the frequency; and
     updating the frequency partitioned Bloom filter vector in the repository based on the terms;
     storing an identifier for the log record associated with the frequency partitioned Bloom filter vector; and
   based on the frequency of occurrence not satisfying the defined frequency range:
     identifying a type identifier based on the terms;
     selecting a type identifier partitioned Bloom filter vector from among the plurality of Bloom filter vectors in the repository based on the type identifier;
     updating the type identifier partitioned Bloom filter vector in the repository based on the terms;
     storing an identifier for the log record associated with the type identifier partitioned Bloom filter vector;
   for each unique term contained in earlier log records received by the log record processing computer:
     counting a number of occurrences of the unique term to generate a historical count for the unique term;
     defining a frequency threshold based on the historical count; and
     storing the frequency threshold among a set of frequency thresholds with a logical association to the unique term;
   selecting frequency thresholds from among the set of frequency thresholds based on the terms of the log record; and
   determining whether the frequency of occurrence satisfies the defined frequency threshold based on comparing the frequency of occurrence of the terms to the frequency thresholds selected from among the set of frequency thresholds.

2. The method of claim 1, further comprising:
   receiving a search query defining search terms;
   for each of a group of the Bloom filter vectors in the repository:
     retrieving the Bloom filter vector from the repository;
     determining based on the Bloom filter vector whether at least one of the log records associated with the Bloom filter vector contains all of the search terms; and
     responsive to determining that at least one of the log records associated with the Bloom filter vector contains all of the search terms, searching among each of the log records associated with the Bloom filter vector to identify which of the log records associated with the Bloom filter vector satisfy all of the search terms; and
   returning log records, identified by the search as satisfying all of the search terms, as a response to the search query.

3. The method of claim 2, further comprising:
   identifying the group of the Bloom filter vectors based on the time period identified by the search query.

4. The method of claim 2, wherein the returning log records, identified by the search as satisfying all of the search terms, as the response to the search query, comprises:
   retrieving the log records, identified by the search as satisfying all of the search terms, from a log record repository;
   generating a report listing each of the log records retrieved from the log record repository; and
   communicating the report to a user computer from which the search query was received by the log record processing computer.

5. The method of claim 1, wherein the counting a number of occurrences of the unique term to generate a historical count for the unique term, comprises:
   counting a number of occurrences of the unique terms contained in earlier log records received in the stream of log records from the host machine node.

6. The method of claim 1, wherein the defining a frequency threshold based on the historical count, comprises:
   decreasing values of the frequency thresholds selected from among the set of frequency thresholds based on less frequent occurrence of the terms within a defined time interval; and
   increasing values of the frequency thresholds selected from among the set of frequency thresholds based on more frequent occurrence of the terms within the defined time interval.

7. The method of claim 1,
   wherein the determining frequency of occurrence of the terms across the log records of the stream, comprises retrieving a list of infrequently occurring terms, and
   further comprising determining that the frequency of occurrence satisfies a defined frequency threshold based on a defined number of the terms of the log record matching the infrequently occurring terms in the list.

8. The method of claim 1, wherein the identifying a type identifier based on the terms, comprises:
   comparing unique ones of the terms of the log record to template terms associated with different ones of a plurality of type identifiers within a type identifier repository; and
   selecting the type identifier from among the plurality of type identifiers based on defined matching rule being satisfied by the comparison of the unique ones of the terms of the log record to the template terms associated with type identifier.

9. The method of claim 8, wherein:
   the defined matching rule comprises matching a sequence of at least some of the terms contained in the log record to a sequence of the template terms associated with one of the type identifiers.

10. The method of claim 8, wherein:
    the defined matching rule comprises matching a sequence of at least some of the terms contained in the log record to a defined sequence of terms output by a source software associated with one of the type identifiers.

11. A computer program product comprising:
    a non-transitory computer readable storage medium having computer readable program code embodied therewith, the computer readable program code comprising:

computer readable program code to receive a log record as part of a stream of log records from a host machine node, the log record comprising terms;
computer readable program code to determine frequency of occurrence of the terms across the log records of the stream;
computer readable program code to, based on the frequency of occurrence satisfying a defined frequency threshold, perform:
selecting a frequency partitioned Bloom filter vector from among a plurality of Bloom filter vectors in a repository based on the frequency; and
updating the frequency partitioned Bloom filter vector in the repository based on the terms and associating;
storing an identifier for the log record associated with the frequency partitioned Bloom filter vector;
computer readable program code to, based on the frequency of occurrence not
satisfying the defined frequency range, perform:
identifying a type identifier based on the terms;
selecting a type identifier partitioned Bloom filter vector from among the plurality of Bloom filter vectors in the repository based on the type identifier;
updating the type identifier partitioned Bloom filter vector in the repository based on the terms; and
storing an identifier for the log record associated with the type identifier partitioned Bloom filter vector;
computer readable program code to, for each unique term contained in earlier log records received by the log record processing computer, perform:
counting a number of occurrences of the unique term to generate a historical count for the unique term;
defining a frequency threshold based on the historical count; and
storing the frequency threshold among a set of frequency thresholds with a logical association to the unique term;
computer readable program code to select frequency thresholds from among the set of frequency thresholds based on the terms of the log record; and
computer readable program code to determine whether the frequency of occurrence satisfies the defined frequency threshold based on comparing the frequency of occurrence of the terms to the frequency thresholds selected from among the set of frequency thresholds.

12. The computer program product of claim 11, further comprising:
computer readable program code to receive a search query defining search terms;
computer readable program code to, for each of a group of the Bloom filter vectors in the repository, perform:
retrieving the Bloom filter vector from the repository;
determining based on the Bloom filter vector whether at least one of the log records associated with the Bloom filter vector contains all of the search terms; and
responsive to determining that at least one of the log records associated with the Bloom filter vector contains all of the search terms, searching among each of the log records associated with the Bloom filter vector to identify which of the log records associated with the Bloom filter vector satisfy all of the search terms; and
computer readable program code to return log records, identified by the search as satisfying all of the search terms, as a response to the search query.

13. The computer program product of claim 12, further comprising:
computer readable program code to identifying the group of the Bloom filter vectors based on the time period identified by the search query.

14. The computer program product of claim 12, wherein the computer readable program code to return log records, identified by the search as satisfying all of the search terms, as a response to the search query, comprises:
computer readable program code to retrieve the log records, identified by the search as satisfying all of the search terms, from a log record repository;
computer readable program code to generate a report listing each of the log records retrieved from the log record repository; and
computer readable program code to communicate the report to a user computer from which the search query was received by the log record processing computer.

15. A computer program product comprising:
a non-transitory computer readable storage medium having computer readable program code embodied therewith, the computer readable program code comprising:
computer readable program code to receive a log record as part of a stream of log records from a host machine node, the log record comprising terms;
computer readable program code to determine frequency of occurrence of the terms across the log records of the stream;
computer readable program code to, based on the frequency of occurrence satisfying a defined frequency threshold, perform:
selecting a frequency partitioned Bloom filter vector from among a plurality of Bloom filter vectors in a repository based on the frequency; and
updating the frequency partitioned Bloom filter vector in the repository based on the terms and associating;
storing an identifier for the log record associated with the frequency partitioned Bloom filter vector; and
computer readable program code to, based on the frequency of occurrence not satisfying the defined frequency range, perform:
identifying a type identifier based on the terms;
selecting a type identifier partitioned Bloom filter vector from among the plurality of Bloom filter vectors in the repository based on the type identifier;
updating the type identifier partitioned Bloom filter vector in the repository based on the terms; and
storing an identifier for the log record associated with the type identifier partitioned Bloom filter vector;
wherein the computer readable program code to determine frequency of occurrence of the terms across the log records of the stream, comprises computer readable program code to retrieve a list of infrequently occurring terms, and
further comprising computer readable program code to determine that the frequency of occurrence satisfies a defined frequency threshold based on a defined number of the terms of the log record matching the infrequently occurring terms in the list.

16. A computer program product comprising:
a non-transitory computer readable storage medium having computer readable program code embodied therewith, the computer readable program code comprising:
  computer readable program code to receive a log record as part of a stream of log records from a host machine node, the log record comprising terms;
  computer readable program code to determine frequency of occurrence of the terms across the log records of the stream;
  computer readable program code to, based on the frequency of occurrence satisfying a defined frequency threshold, perform:
    selecting a frequency partitioned Bloom filter vector from among a plurality of Bloom filter vectors in a repository based on the frequency; and
    updating the frequency partitioned Bloom filter vector in the repository based on the terms and associating;
    storing an identifier for the log record associated with the frequency partitioned Bloom filter vector; and
  computer readable program code to, based on the frequency of occurrence not satisfying the defined frequency range, perform:
    identifying a type identifier based on the terms;
    selecting a type identifier partitioned Bloom filter vector from among the plurality of Bloom filter vectors in the repository based on the type identifier;
    updating the type identifier partitioned Bloom filter vector in the repository based on the terms; and
    storing an identifier for the log record associated with the type identifier partitioned Bloom filter vector;
wherein the computer readable program code to identify a type identifier based on the terms, comprises:
computer readable program code to compare unique ones of the terms of the log record to template terms associated with different ones of a plurality of type identifiers within a type identifier repository; and
computer readable program code to select the type identifier from among the plurality of type identifiers based on defined matching rule being satisfied by the comparison of the unique ones of the terms of the log record to the template terms associated with type identifier.

17. The computer program product of claim 16, wherein:
the defined matching rule comprises matching a sequence of at least some of the terms contained in the log record to a sequence of the template terms associated with one of the type identifiers.

18. The computer program product of claim 16, wherein:
the defined matching rule comprises matching a sequence of at least some of the terms contained in the log record to a defined sequence of terms output by a source software associated with one of the type identifiers.

* * * * *